United States Patent
Wu

(10) Patent No.: US 10,181,256 B2
(45) Date of Patent: Jan. 15, 2019

(54) MULTIPLE TARGET LOCATING AND ALARMING SYSTEM

(71) Applicant: LINCTRONIX LTD., New Taipei (TW)

(72) Inventor: Chia-Jen Wu, New Taipei (TW)

(73) Assignee: LINCTRONIX LTD., New Taipei (TW)

(*) Notice: Subject to any disclaimer, the term of this patent is extended or adjusted under 35 U.S.C. 154(b) by 0 days.

(21) Appl. No.: 15/462,488

(22) Filed: Mar. 17, 2017

(65) Prior Publication Data
US 2017/0270776 A1    Sep. 21, 2017

(30) Foreign Application Priority Data
Mar. 18, 2016   (TW) .............................. 105108422 A

(51) Int. Cl.
| | | |
|---|---|---|
| *G08B 1/08* | (2006.01) | |
| *G08B 25/10* | (2006.01) | |
| *H04B 17/318* | (2015.01) | |
| *H04W 64/00* | (2009.01) | |
| *H04W 4/70* | (2018.01) | |
| *H04W 4/06* | (2009.01) | |
| *H04B 17/23* | (2015.01) | |
| *H04B 17/27* | (2015.01) | |
| *H04W 4/80* | (2018.01) | |

(52) U.S. Cl.
CPC ............ *G08B 25/10* (2013.01); *H04B 17/318* (2015.01); *H04W 4/70* (2018.02); *H04W 64/003* (2013.01); *H04B 17/23* (2015.01); *H04B 17/27* (2015.01); *H04W 4/06* (2013.01); *H04W 4/80* (2018.02)

(58) Field of Classification Search
CPC ... G08B 25/10; G08B 21/182; H04W 64/003; H04W 4/005; H04W 4/06; H04W 4/008; H04B 17/318; H04B 17/27; H04B 17/23
USPC ..................................................... 340/539.22
See application file for complete search history.

(56) References Cited

U.S. PATENT DOCUMENTS

| | | | |
|---|---|---|---|
| 2010/0030434 A1 | 2/2010 | Okabe et al. | |
| 2011/0003610 A1 | 1/2011 | Key et al. | |
| 2014/0201321 A1 | 7/2014 | Donaghey | |
| 2014/0299783 A1 | 10/2014 | Valentino et al. | |
| 2015/0002292 A1 | 1/2015 | Cavalcanti et al. | |
| 2015/0271742 A1* | 9/2015 | Moskowitz | H04W 4/025 370/328 |
| 2015/0334559 A1* | 11/2015 | Pesola | H04L 51/18 455/419 |

(Continued)

*Primary Examiner* — Tanmay Shah

(57) ABSTRACT

A multiple target locating and alarming system comprises a wireless sensor, a wireless base station, and a server. The wireless sensor is disposed on a target. The wireless sensor comprises a wireless communicating module and a sensor identity, and sends a wireless message including the sensing data and sensor identity. The wireless base station receives the wireless message and measures the RSSI (Received Signal Strength Indicator) of the wireless message to the server. The server includes the deploy information of the wireless base stations and receives the wireless messages with the RSSI for calculating a location of the wireless sensor, then monitoring whether the locating position matches an alarm criterion; if it matches, the server publish a warning notification. Compared to the prior art, the present invention can effectively shorten the react time while abnormal occurs.

7 Claims, 5 Drawing Sheets

(56) References Cited

U.S. PATENT DOCUMENTS

2017/0124853 A1* 5/2017 Mehta ................ H04W 4/90
2017/0201504 A1* 7/2017 Funk ................ H04L 63/0471

* cited by examiner

MULTIPLE TARGET LOCATING AND ALARMING SYSTEM

BACKGROUND OF THE INVENTION

Field of the Invention

The present invention relates to a multiple target locating and alarming system, and more particularly, the present invention relates to a system for positioning a target and receiving a data on the target from a sensor component via wireless communicating technology, which can send an alarm when judging the target with an alarm condition.

Description of the Prior Art

There are several kinds of wireless sensors such as thermometers, hydrometers, other kinds of switches, which can separate two types of the communication ways. The first type of the communication way is a broadcast-observer architecture—a sensor broadcasts a sensing data for a period time, and all nearby observers are able to receive the sensing data through the broadcasting channel without establishing connection to the sensor. The second type of communication way is a master-slave architecture—the master needs to establish connection to the sensor in order to get the sensing data.

No matter the broadcaster-observer or the master-slave, typically the received device has to keep close to the sensors within the communication range. For tracking multiple targets in wide areas, this conventional technology is not suitable.

SUMMARY OF THE INVENTION

The present invention proposes a multiple target locating and alarming system. The multiple target locating and alarming system can judge whether a target's location or a target's sensing data matches a preset criterion. If the result is matched, the multiple target locating and alarming system issues an alarm to the administrators.

According to an embodiment of the invention, multiple target locating and alarming system comprises a wireless sensor, a wireless base station, and a server.

According to an embodiment of the invention, wherein the wireless sensor is disposed on a target and comprising a wireless communicating module with a unique device identity; the communicating module sends a wireless message carrying the sensing data and the device identity. Once a wireless base station receiving the wireless message, the wireless base station immediately makes a contact report, which carries the sensor identity, the sensing data, and the RSSI (Received Signal Strength Indicator) of the message, to the server. The server comprises a locating engine and an alarm module. The locating engine has the deployment information of the wireless base stations. The location engine keeps estimating the position of a wireless sensor by collecting the contact reports from all wireless base stations. The location engine stores the estimated location of each sensor to the database for the alarm module. The alarm module keep tracking the sensor's location and sensing data in a real time manner. Once the location and sensing data fulfill criteriona preset alarm criterion, the alarm module makes an alarm notification to the administrators.

According to an embodiment of the invention, wherein the wireless message is sent by the wireless communicating module via wireless broadcast channels. According to another embodiment of the invention, wherein the wireless communicating module establishes a wireless network connection to the wireless base station and sends the wireless messages to the wireless base station via this wireless network connection. The alarm condition is selected from a group comprising the tracked targets entering a specified area, leaving a specified area, continuously staying a specified area over a period, or the number of targets over the limitation of a specified area, wherein the alarm module sends alarm notifications accordingly.

According to another embodiment of the invention, multiple target locating and alarming system comprises a wireless sensor, a wireless base station, and a server.

According to another embodiment of the invention, wherein a wireless sensor is disposed on a target and comprises a wireless communicating module, a sensor component and a sensor identity. The sensor component measures the sensing data on the target. The wireless communicating module sends a wireless message, which carries the sensing data and sensor identity, to the wireless base station. The wireless base station receives the wireless message and sends a sensor contact report, which contains the RSSI, sensing data and sensor identity, to the server. The sever comprises a locating engine and monitoring module. The locating engine has the deploy coordination of wireless base stations. The locating engine estimates the location of each wireless sensor by the RSSI value in sensor contact reports. The locating engine save the location of wireless sensors into database for analytic. The alarm module keeps monitoring whether the sensing data and the location of the sensor match a preset criterion or not. If the preset alarm criterioncriterion is fulfilled, the alarm module sends a notification to the administrators.

According to another embodiment of the invention, the alarm module further judges whether the locating position matches a second alarm condition, and if YES, sends a second alarm, wherein the second alarm of the second alarm condition is selected from a group comprising the location position entering a specified area, leaving a specified area, continuously staying a specified area over a setting time length, and a target number exceeding a default value in a default area, wherein the alarm module alarms respectively according to the corresponding the second alarm condition.

Compared to the related art, the present invention disposes multiple wireless base stations to receive the wireless messages from the wireless sensors disposed on the targets. All wireless base station keeps updating the RSSI and the sensing data to the server. The server's locating engine estimates target location by RSSI between the wireless base stations and the wireless sensor disposed on the target. The alarm module is used to monitor whether a target's sensing data and the target's location matching a preset criterion. If the preset criterioncriterion is matched, the multiple target locating and alarming system immediately sends alarm event notification to the administrators. The multiple target locating and alarming system can reduce the reaction time to deal with the problems.

Many other advantages and features of the present invention will be further understood by the following detailed description and the appended drawings.

BRIEF DESCRIPTION OF THE APPENDED DRAWINGS

DETAILED DESCRIPTION OF THE INVENTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1:
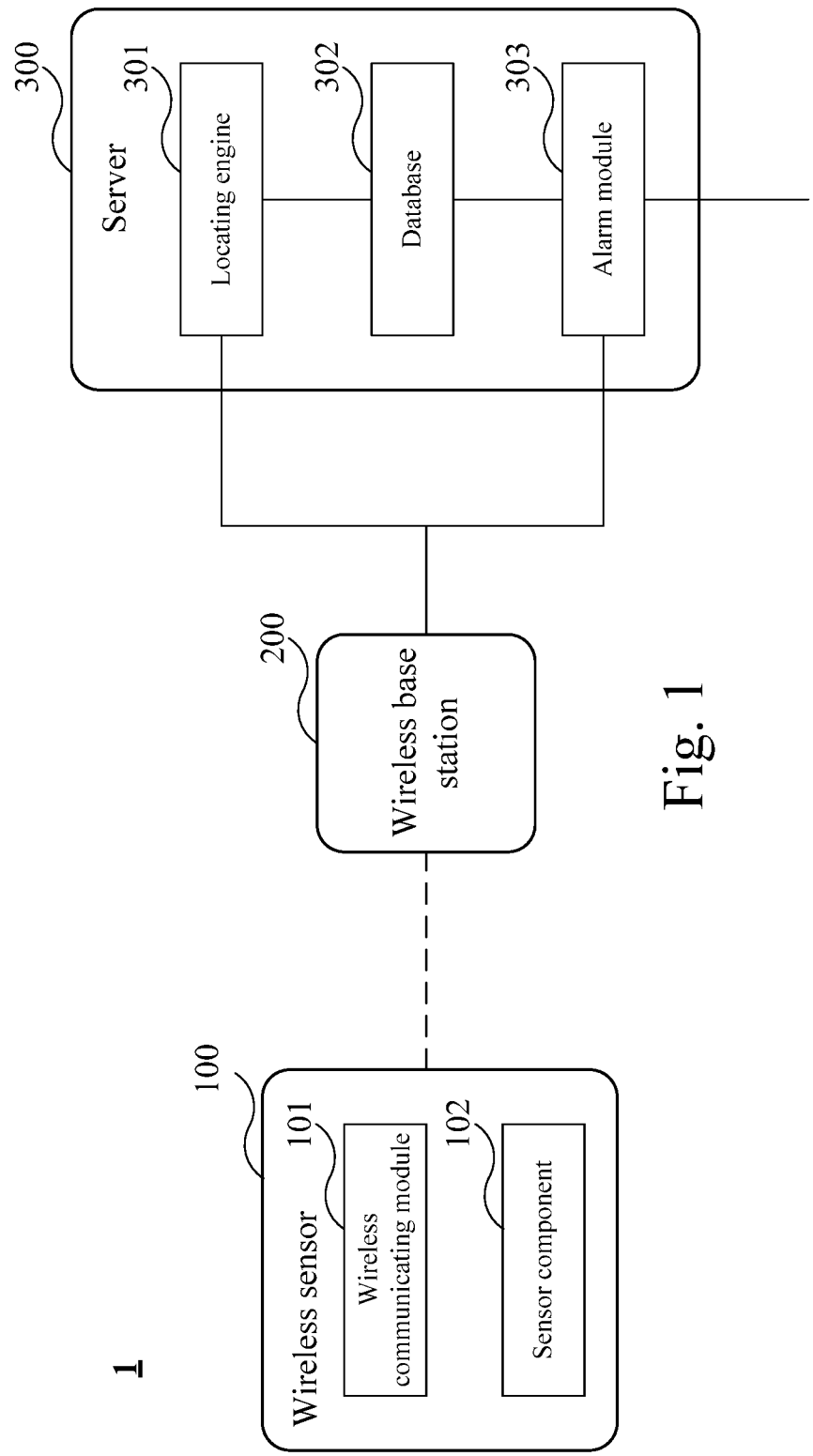
FIG. 1 is a block diagram of an embodiment of the invention.

Please refer to FIG. 1; FIG. 1 is a block diagram of an embodiment of the invention. This invention provides a multiple target locating and alarming system 1 comprising a wireless sensor 100, a wireless base station 200, and a server 300. The wireless sensor 100 is communicating with the wireless base station 200 via wireless broadcasting mode or master-slave mode as shown in dotted line of FIG. 1. The wireless base station 200 is communicating with the server 300 via a network connection as shown in active line of FIG. 1.

According to an embodiment of the invention, the wireless sensor 100 is disposed on a target and comprising a wireless communicating module 101, a sensor component 102 and a sensor identity. The sensor identity is a unique identifier assigned to the wireless sensor 100. The sensor component 102 measures sensing data on the target. The wireless communicating module 101 either broadcasts or transmits wireless messages, which comprising the sensor identity and the sensor data, to the wireless stations 200.

The wireless base station 200 receives the wireless messages from wireless sensor 100 and make a sensor contact report, which comprising the sensor identity, received signal strength indicator (RSSI), and the sensing data. The wireless base station 100 sends the server contact report to the server 300 via network connection. According to an embodiment of the invention, the network connection between the server 300 and the wireless base station 200 is using the Message Queuing Telemetry Transport (MQTT) technology. The network connection between the server 300 and the wireless base station 200 can also be realized by Advanced Message Queuing Protocol (AMQP), Hypertext Transport Protocol (HTTP), and HTTP over Secure Sockets Layer (HTTPS) or other communicating protocols.

Server 300 comprises a locating engine 301, a database 302, and an alarm module 303. The locating engine 301 holds the deployment information of the wireless base stations. The locating engine 301 calculates the location of the wireless sensor 100 according to the sensor contact reports, which comprising sensor identity, RSSI, and the sensing data. The database 302 records the locating of the wireless sensor 100 and the sensing data 102. The alarm module 303 monitors whether the sensing data and sensor's location is matching a preset criterion or not. If the preset criterion fulfills, the alarm module publishes a warning notification to administrators.

According to an embodiment of the invention, a wireless sensor 100 is disposed on human bodies, animals, movable or fixable apparatuses, such as cars, medical wagons, and storehouse staffs, to report the sensing data by wireless messages. The sensor identity assigned to the wireless sensor 100 is a unique string or number. The sensor identity could be MAC address, Universally Unique Identifier (UUID), serial number, or any other unique text that can recognize the sensing data origination.

Furthermore, the wireless sensor 100 could be powered by a movable power supply. The wireless communicating module 101 saves a locating engine and sends the wireless message to the wireless base station 200 periodically through the locating engine. Wireless sensor 100 monitors the voltage of the power input and reports the voltage level to wireless base station. According to an embodiment of the invention, the wireless communicating module 101 is using Bluetooth Low Energy to communicate with wireless base station. The wireless communicating module 101 protocols can be the Wi-Fi, Sub-1G, or other wireless protocols.

The wireless station 200 is able to receive the wireless message from the wireless sensor 100 by broadcast mode or master-slave mode. In broadcast mode, the wireless base station 200 listens on the broadcast channel to receive the wireless broadcasting message sent by the wireless communicating module 101. In master-slave mode, the wireless base station 200 establishes a connection to the wireless communicating module 101. After the connection established, the wireless base station 200 is able to get the sensing data from the wireless communicating module 101.

The sensor component 102 is disposed on the wireless sensor 100 for measuring the sensing data from the target. Wherein the sensor component 102 could be a temperature sensor, a humidity sensor, a voltage sensor, a heartbeat sensor, a gyroscope, a gravity (acceleration) sensor, a position sensor, a luminosity sensor, a skin temperature sensor, a capacitance sensor, a UV sensor, an infrared sensor, a microphone, a barometer, a color sensor, an angle sensor, a pressure sensor, a proximity sensor, a flow sensor, an electrostatic capacity sensor, an atmosphere (gas, CO, alcohol, or other gas detect) sensor, a magnetic field sensor, etc. The sensor component 102 sensing data type is various. For example, in the case of the sensor component 102 being a gravity (acceleration) sensor, the measured sensing data is acceleration. In the case of the sensor component 102 being a heartbeat sensor, the measured sensing data is a heartbeat pulse count.

According to an embodiment of the invention, the wireless sensor 100 is not necessary to include both wireless communicating module 101 and sensor component 102. The wireless communicating module 101 can be disposed on the wireless sensor 100 depending on the inventors' demand.

Figure 2:
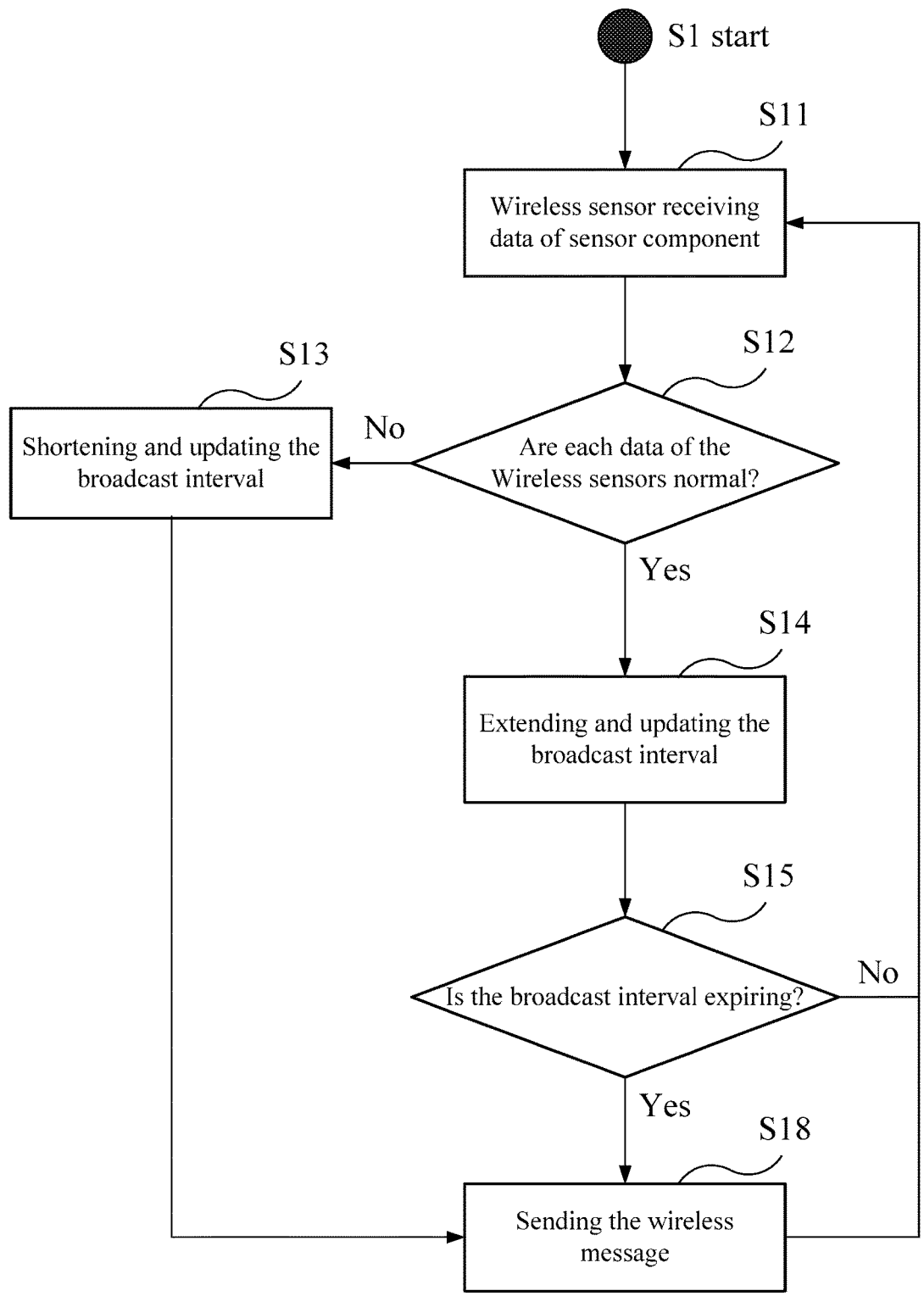
FIG. 2 is a flow chart of wireless sensor according to an embodiment of the invention.

Please refer to the FIG. 2; FIG. 2 is a flow chart of wireless sensor according to an embodiment of the invention. In the case the wireless sensor 100 with both wireless communicating module 101 and the sensor component 102, the wireless sensor 100 adjusts the broadcast interval of the wireless communicating module 101 according to the measured data of the sensor component 102. Taking the embodiment as an example, start step S1: a sensor component 102 is the gravity (acceleration) sensor, and then go to the step S11: the wireless sensor 100 reads the data of the sensor component 102. When the sensor component 102 detects the acceleration over the preset threshold, the wireless sensor 100 goes from step S12 to step S13. Then the wireless communicating module 101 shortens the wireless message broadcasting interval and goes to step S18. The wireless communicating module 101 broadcast the wireless messages in the new broadcast interval. If the sensor component 102 does not detect an over-threshold acceleration, the wireless sensor 100 goes from step S12 to step S14. Then the wireless communicating module 101 extends broadcast interval. Wherein the condition of the wireless sensor 100 is depended on the user's setting, this invention does not limit to the mentioned embodiment.

Then the step goes to step S15. If the sensor component 102 does not sense the acceleration under the condition that a periodical broadcasting of the current locating engine setting is due for the wireless sensor 100, or if the sensor component 102 senses the acceleration under the default parameter range of the database 302 for the normal stage in the wireless sensor 100 value, the wireless communicating module is disposed selectively to a power saving mode and flow reversely to step S11 by the wireless sensor 100. The wireless sensor 100 terminates the power saving mode immediately until the sensor component 102 senses acceleration or the sensor component 102 senses the acceleration exceeding the default parameter range of the database 302. Next, the step goes from step S11 to the step S12, then goes from step S13 to step S18, and sends the wireless message. Or, the wireless sensor 100 leaves the power saving mode immediately when the step S15 of the broadcast interval is due. Then the step goes to step 18 from step 15 for sending the wireless message to the wireless base station 200 so that the wireless sensor 100 can rapidly update the sensing data and position of the target in this invention.

According to an embodiment of the invention, the wireless sensor 100 sends the wireless message with its report interval. The wireless base station 200 reports the sensor report interval to the server. The locating engine 301 holds the report interval of each sensor and sets an idle timer respectively. If no sensor report received before the idle timer expires, the alarm module 303 will publish a warning notification to administrators.

The wireless base station 200 is disposed on the places comprising stores, nursing home, farms, hospitals, etc. The multiple wireless base stations 200 are disposed to covering the location tracking area. Ensure the wireless sensor 100 could communicate with at least one wireless base station 200. The deploy map of wireless base station is record in the locating position module 301 of the server 300.

Figure 3:
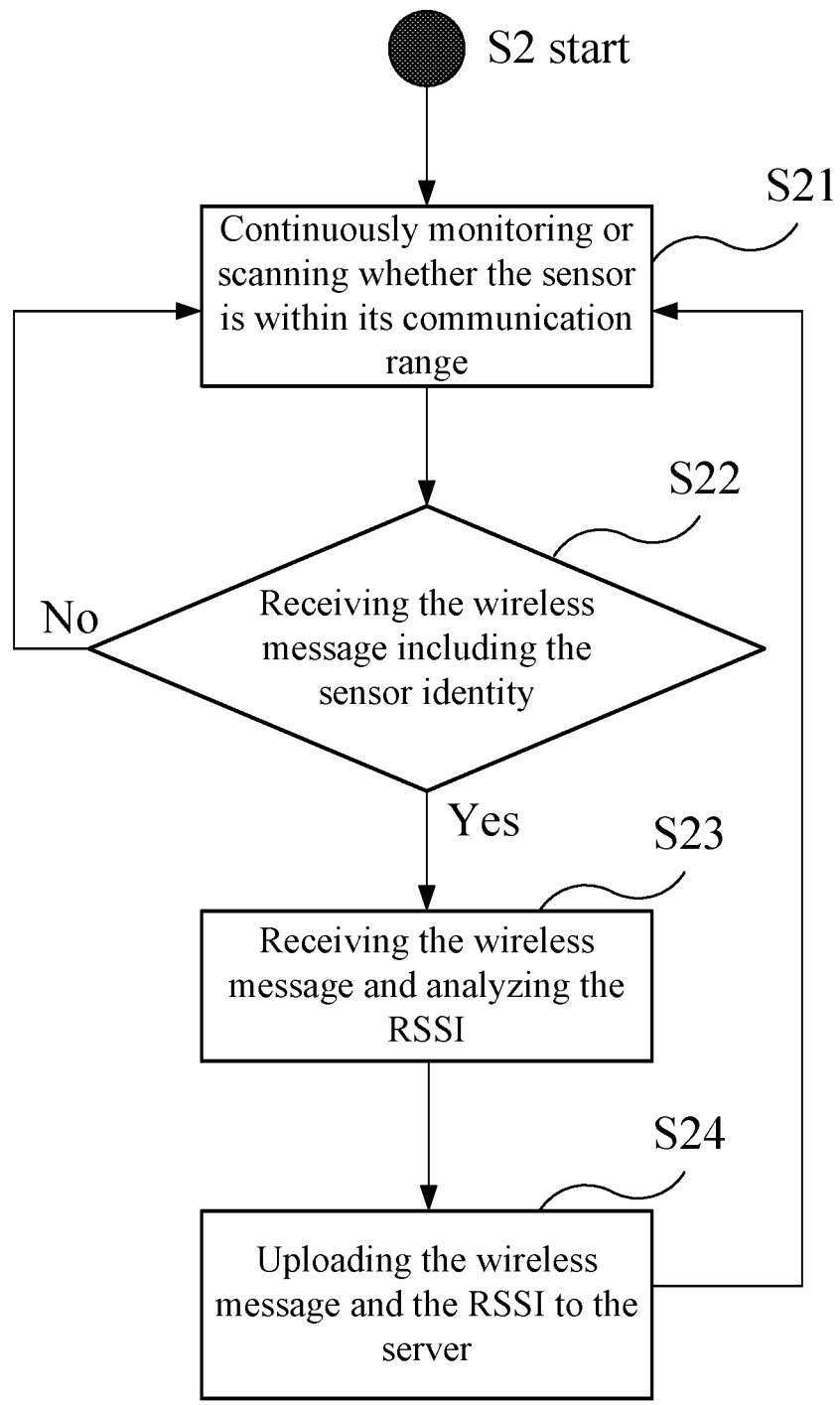
FIG. 3 is a flow chart of wireless base station reporting target information according to an embodiment of the invention.

Please refer to FIG. 3; FIG. 3 is a flow chart of wireless base station which reports target information according to an embodiment of the invention. According to the embodiment of the invention, a network connection is established between wireless base station 200 and server 300. The wireless base station goes to step S21 from step S2: continuously monitoring or scanning whether the sensor is within its communication range. Then the step goes to the step S22: receiving the wireless messages. If a valid wireless message is received, the step goes to step S23: analyzing the RSSI (received signal strength indicator). If no valid message is received, the step goes back to step S21 from step S22, get ready for the next message.

Furthermore, the wireless message could comprise the transmit power level of wireless communicating module 101. By the transmit power level, each wireless base station could compensate the RSSI in the sensor contact report. This can fine tune the RSSI from different wireless sensors. To reduce the target locating position error via RSSI calculated from the locating engine 301. Then, the step goes to step S24: uploading the RSSI and sensing data to the server after step S24, the step goes back to the step S21 for continuously monitoring the wireless sensors and ready to handle next received message.

The wireless base station 200 physical uplink could be Ethernet, IEEE802.11 (Wi-Fi), and 3G/4G/LTE. A communicating protocol between the wireless base station 200 and the sever 300 could be Message Queuing Telemetry Transport (MQTT), Hypertext Transport Protocol (HTTP), and HTTP over Secure Sockets Layer (HTTPS). The communicating protocol is not limited to the mentioned above. Considering the communication privacy, the TLS or SSL protocol could be used for data encryption.

Figure 4:
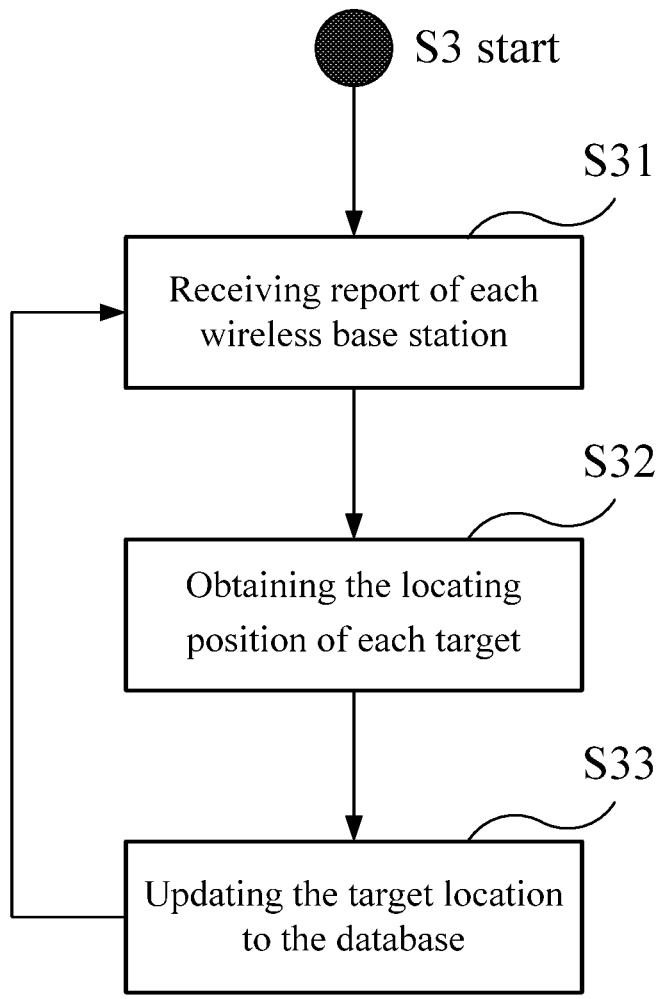
FIG. 4 is a flow chart of locating engine updating the location information according to an embodiment of the invention.

Please refer to the FIG. 4; FIG. 4 discloses the location information updating flow according to an embodiment of the invention. The step starts from step S3. When the server 300 receives the sensor contact report from the wireless base station 200, the server 300 goes to step S32 from step S31. The locating engine 301 estimates the location of the wireless sensor 100 according to the sensor identity, RSSI, and the report originating wireless base station 200. When sensor location is calculated, the step goes to step S33: updating the target location to the database. Wherein, the database 302 could be memory, a Time Series Database (TSDB), or other kinds of database. After updating the sensor's location completed, the step goes back to step 31 and waits for next sensor contact report from wireless base station 200.

Figure 5:
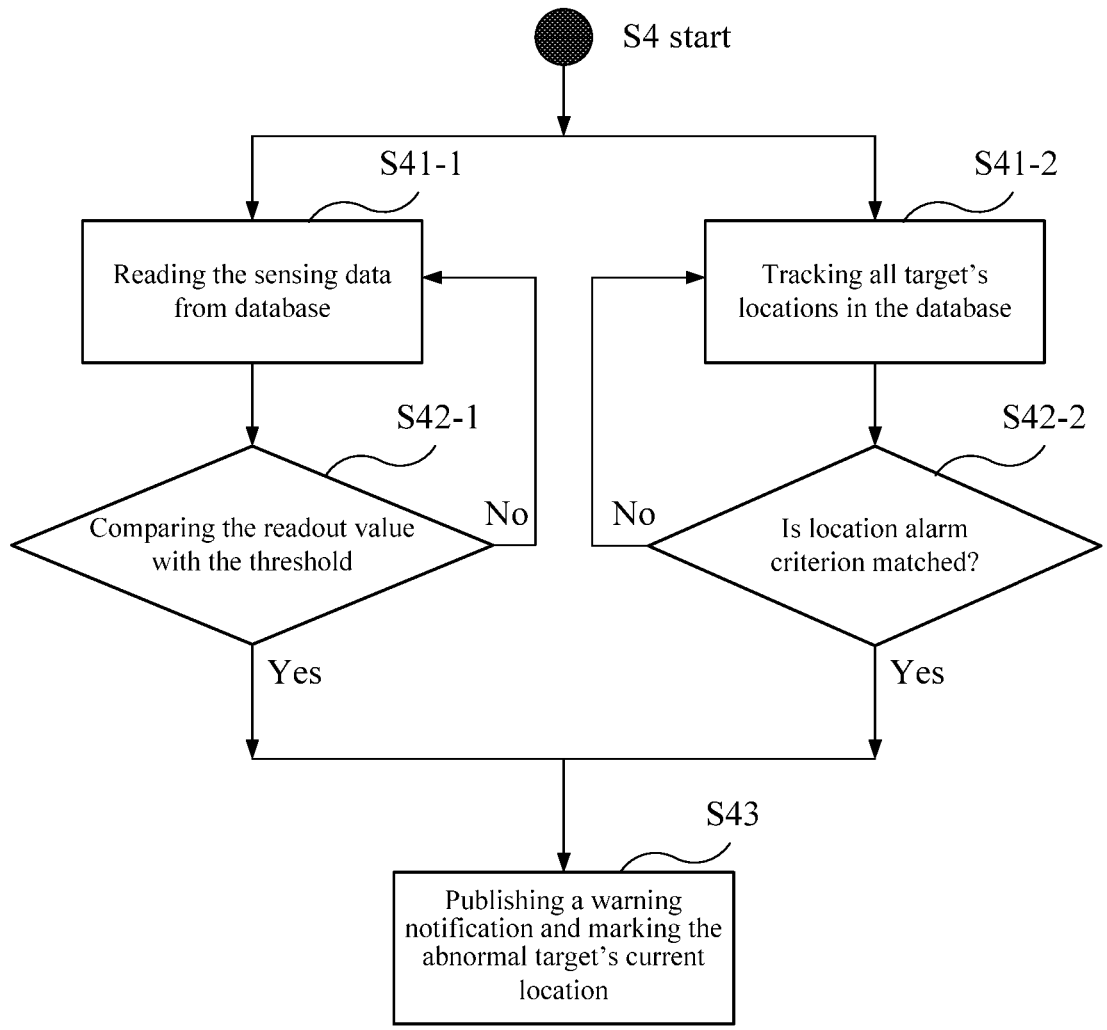
FIG. 5 is a flow chart of alarm module publishing the alarm notification according to an embodiment of the invention.

Please refer to the FIG. 5; FIG. 5 is a flow chart of alarm module sends the warning notification according to an embodiment of the invention. The step starts from step S4. The alarm module 303 monitors the sensing data measured by sensor component 102. If the sensing data is over the alarm threshold, the alarm module publishes the warning notification. Meanwhile, the alarm module 303 also tracks the sensors' location. If the location of sensor is abnormal, a warning notification is published. As shown in FIG. 5, the sensing data monitoring and location tracking are working independently.

The first step of monitoring sensing data goes to step S41-1 from step S4: reading the sensing data from database 302. For example, the alarm module 303 gets the latest power voltage of wireless sensor 100. Then the step goes to step S42-1, comparing the readout value with the low battery threshold, which is preset in database 302. If the readout sensing data is over the threshold, the alarm module 303 will publish a warning notification in step S43.

Meanwhile, the alarm module 303 goes to step S41-2 from step S4: tracking all target's locations in the database 302. The alarm module 303 could read the coordination of each sensor and then go to S42-2: checking the sensor is inside or outside a specified area, which is preset in the alarm criterion.

Wherein the alarm criterion is selected from a group comprising the target entering a specified area, leaving a specified area, continuously staying a specified area over a long period, and the outnumbered targets inside a specified area. Any of the alarm criterion is satisfied, the alarm module 303 goes to step S43: publishing a warning notification and marking the abnormal target's current location. Then, the alarm module 303 goes back to step S41-2 for checking the next location data.

According to the embodiment of the invention, when the wireless sensor 100 installs the wireless communicating module 101 without sensor component 102, the alarm module 303 of the server 300 only track the target's location without checking sensing data.

The warning notification could be in multiple styles. It could be a text message, voice or other ways. Administers can react immediately once received the warning notification.

The alarm module can suppress the redundant warning notifications when the abnormal condition lasting. The alarm module will publish the warning notification only once when the first time the alarm criterion is matched.

The real application for this invention comprises the central mobile call system for nursing home. In the prior art, regarding the call system for the hospital and the nursing home, the emergency call device is set above the head of the bed, bathroom, or other public area. People can push the emergency button disposed on the emergency call device if people need to be protected. The monitoring system in the nursing center shows the calling room and the bed number through the wireless transfer or wire transfer. However, if the emergency state happens under the circumstance that people fall down on the sidewalk or in the bathroom without the call device, people have no mobility to push the emergency button so that the first aided time is missed.

If adopting this invention, people can wear a wireless pager (wireless sensor 100), this pager comprises a push button. People can push the button in the sensor when people need the nursing staff help. The wireless communicating module 101 does not send the wireless message when non-pushing the button. The wireless communicating module 101 of the wireless sensor 100 starts sending the wireless message and sending the information to the remote server 300 through the nearly wireless base station 200 when detecting the button pushed. Then the caller's position can be found by the locating engine 301 via the RSSI of the wireless pager (wireless sensor 100). Then the alarm module 303 shows the caller's name and the position on the manage interface and the nursing staff can go to aid according to the position information.

If adopting this invention, people can wear a wireless pager (wireless sensor 100), this pager comprises a push sensor and heartbeats sensor component. The wireless communicating module 101 of the wireless pager (wireless sensor 100) sends the wireless message including the heartbeats information. When the heartbeats information exceeds the maximum or the minimum of the default value (default value can be set by different people; for example, for A people the maximum heartbeat is 150/min, minimum heartbeat is 50/min), then the caller's position can be found by the locating engine 301 via the RSSI of the wireless pager (wireless sensor 100). Then the alarm module 303 shows the caller's name, heartbeat information, and the position on the management interface. Therefore, the nursing staff can go to aid according to the position information.

According to a better embodiment of the invention, the industrial safety monitoring alarm system is used. Due to the laws and the laborer protected requirement, the big automation factory needs a high level design for safety environment monitoring. The environment needs to be a state that allows people to enter the working space without danger. The detector sole in the market is a hand drip and an open-loop detecting method by the staff to operate by themselves. The remote staff can not know whether the working staff is safe, protected by the SOP, even cannot know the current position. If accident happened, no one can get the position of the staff. And the aided time is missed until noticing something unusual.

If adopting this invention, kinds of sensing environment state of the wireless sensor 100 is disposed on the space where may hurt human body. The working staff wears the small size of the wireless sensor 100 that can effectively reduce the industrial safety accident. For example, the waste water tank needs to be cleaned periodically in the liquid crystal display (LCD) factory. The waste water tank emission needs to be waited for a while for the concentration of the oxygen to increase so that the staff can enter to execute the cleaning. If entering earlier, the staff may have hypoxia and pass out in the tank. In this invention, the wireless sensor 100 including the atmosphere sensor component can be set to detect the oxygen concentration and other danger gas concentration in the waste water tank, and send the information to the remote server 300. For example, when the concentration of the oxygen is lower than 19.5% and some people are detected in the airtight space, the monitoring center (with a connection with the remote server 300 or disposed on a remote server 300) sends a voice/optical alarm to notice the on-duty personnel and shows the on-duty personnel's names and the dangerous area. The on-duty personnel use the wireless call to notice the working staff to escape, open the gas inputting system, and other SOP. If the working staff has no response or the position does not move confirmed by the on-duty personnel, the accident happened to the working staff is judged, and then the on-duty personnel can notice the nursing staff to aid immediately so that can reduce the industrial safety accident and injury.

In summary, according to an embodiment of the invention, a multiple target locating and alarming system comprises a wireless sensor, a wireless base station, and a remote server. Wherein the wireless sensor is disposed on the target, comprising the wireless communicating module and the sensor identity, the communicating module sends the wireless message comprising the sensor identity, and the wireless base station receives the wireless message and reports the RSSI of the wireless message. The remote server comprises the locating engine and the alarm module. The locating engine stories the locating position information of the wireless base station, and calculates the location position of the wireless sensor according to the sensor identity, the RSSI and the locating position information. The alarm module judges whether the locating position matches with the alarm condition. If YES, send an alarm.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the meets and bounds of the appended claims.

What is claimed is:

1. A multiple target locating and alarming system, comprising:
   a wireless sensor, disposed on a target and comprising a wireless communicating module, a sensor component and a sensor identity; the sensor component measures sensing data on the target, and the wireless communicating module sending a wireless message comprising the sensor identity and the sensing data;
   a wireless base station, receiving the wireless message and measures RSSI of the wireless message; and
   a server, establishing a network connection with the wireless base station and receiving the wireless message and the RSSI; the sever comprising:
   a locating engine, storing the location of the wireless base stations and calculating the location of the wireless sensor according to the RSSI; and an alarm module monitoring whether the sensing data is matching an alarm criterion, and publishing a warning notification if the sensing data is matched with the alarm criterion;

wherein the wireless communicating module stories a broadcast interval and periodically broadcasts the wireless message according to the broadcast interval, and the wireless communicating module sends the wireless message further comprising the broadcast interval;

wherein the sensor component further comprises a gravity sensor, and the sensing data comprises an acceleration, wherein the wireless communicating module shortens and updates the broadcast interval when the sensor component senses the acceleration, and the wireless message is sent according to the updated broadcast interval, and the wireless communicating module sends the wireless message according to the updated broadcast interval, wherein the wireless communicating module extends and updates the locating engine when the sensor component does not sense the acceleration, and wireless message is sent according to the updated broadcast interval.

2. A multiple target locating and alarming system, comprising:

a wireless sensor, disposed on a target and comprising a wireless communicating module, a sensor component and a sensor identity; the sensor component measures sensing data on the target, and the wireless communicating module sending a wireless message comprising the sensor identity and the sensing data;

a wireless base station, receiving the wireless message and measures RSSI of the wireless message; and a server, establishing a network connection with the wireless base station and receiving the wireless message and the RSSI; the sever comprising:

a locating engine, storing the location of the wireless base stations and calculating the location of the wireless sensor according to the RSSI; and an alarm module monitoring whether the sensing data is matching an alarm criterion, and publishing a warning notification if the sensing data is matched with the alarm criterion;

wherein the sever stories the sensing data, and the alarm criterion for this sensing data;

wherein the sensor component comprises a gravity sensor, and the sensing data comprises an acceleration, wherein the wireless communicating module shortens and updates a broadcast interval when the sensor component senses the acceleration and the acceleration exceeds a default parameter range, and the wireless message is sent according to the updated broadcast interval, wherein the wireless communicating module extends and updates the broadcast interval when the sensor component does not sense the acceleration, and the wireless message is sent according to the updated locating engine.

3. The multiple target locating and alarming system of claim 1, wherein the alarm module monitoring whether the location of the wireless sensor matches a location alarm criterion; if matches, publish the warning notification, wherein the location alarm criterion is selected from a group comprising the location position entering a specified area, leaving a specified area, continuously staying a specified area over a setting time length, and a number of targets over the limit of area, wherein the alarm module alarms respectively according to the corresponding the location alarm condition.

4. The multiple target locating and alarming system of claim 1, wherein the wireless sensor sends the wireless message through Bluetooth Low Energy protocol.

5. The multiple target locating and alarming system of claim 1, wherein there is a communicating protocol between the wireless base station and the sever, including a communicating protocol, the communicating protocol comprises Message Queuing Telemetry Transport (MQTT), Advanced Message Queuing Protocol (AMQP), Hypertext Transport Protocol (HTTP), and HTTP over Secure Sockets Layer (HTTPS).

6. The multiple target locating and alarming system of claim 1, wherein the wireless message is a wireless broadcast signal, and the wireless communicating module sends the wireless broadcast signal via wireless broadcast channels.

7. The multiple target locating and alarming system of claim 1, wherein the wireless communicating module establishes a wireless network connection with the wireless base station and sends the wireless message to the wireless base station via the wireless network connection.

* * * * *